Patented Dec. 4, 1945

2,390,405

UNITED STATES PATENT OFFICE 2,390,405

METHOD AND MEANS FOR PROCESSING BARIUM CONTAINING GLASS STOCK TO PRODUCE OPTICAL ELEMENTS OR THE LIKE

Victor Walker, Fort Erie, Ontario, Canada, assignor to AlnCin, Inc., Buffalo, N. Y.

No Drawing. Application April 7, 1943, Serial No. 482,174

2 Claims. (Cl. 41—42)

This invention relates to methods and means for processing glass, as in connection with the manufacture of lenses or other optical elements, or the like. More specifically the invention relates to an improved method and means for simultaneously reducing and clearing the surfaces of barium containing glass stock pieces for optical element manufacture, or the like.

As disclosed in my U. S. Patents Nos. 2,213,023; 2,238,008; and 2,275,602 I have previously determined that most types of glass stock may be effectively reduced and cleared at the surface portions thereof by treating the same with a bath comprising a mixture of hydrofluoric and sulphuric acids in water wherein the ratio of sulphuric to hydrofluoric acid is in the neighborhood of 5–1; and that when working with the more common or high silica type glass stocks the treatments referred to in my earlier patents will be productive of satisfactory finishes for the purposes described therein. However, I have now determined that whenever the glass stock contains an appreciable percentage of barium, such as is sometimes required in connection with the fabrication of higher index of refraction optical lenses or prisms or the like, the acid mixtures previously disclosed are not suited to provide optimum results and must be modified in accord with a new concept.

It appears that whenever barium is present in a stock piece with a consequent reduction in the amount of silica contained therein, the action of an acid bath upon such a stock piece is of a character distinctly different from the character of the action when working with relatively high silica content glasses. This difference derives from the fact that the barium salt by-products of the acid reaction upon the glass stock are naturally sodden and have a distinct tendency to adhere firmly to the glassware as they are produced at the exposed surface thereof. As explained in my earlier disclosures aforesaid, the sulphuric acid ingredient of such a bath tends to react with the silica fluoride by-products of the reaction between the hydrofluoric acid ingredient of the bath and the silica content of the glass stock to produce the corresponding sulfate salts. These sulfate salts develop at the exposed surface of the stock piece in the form of a flour-like composition in which are mixed the by-products of the acid reactions with the rarer metallic ingredients of the stock piece.

However, whenever there is a substantial percentage or a preponderance of barium in the stock piece as distinguished from silica, an acid bath mixture of the type referred to hereinabove will cause to be produced on the stock piece a heavy coating comprising to large degree the barium salt by-products and to a minor degree silica sulfate salts. In the presence of an acid bath as previously disclosed this combination of salts possesses the peculiar property of tending to adhere to the stock piece and to resist removal therefrom even though the coated glassware be subjected to relatively violent washing or rinsing or wiping operations. In such case the bulk of the coating may be mechanically rubbed away from the stock piece surface, but a fine film of foggy appearing substance will cling to the stock piece which completely eliminates the possibility of use of the finished article for efficient light transmissive or other optical purposes.

As distinguished from the prior methods and the acid bath mixtures referred to hereinabove, the present invention contemplates employment for the purpose stated of an acid bath comprising a mixture of water and hydrofluoric and sulphuric acids of commercially available grades in which the sulphuric acid is present in increased proportion. For example, when treating a glass in which the barium content approaches or surpasses the silica content the ratio of sulphuric acid to hydrofluoric acid may effectively be within the range of from 7:1 to 10:1 for the same amount of water as in the baths of the earlier methods referred to. In any event the problem is to provide sufficiently concentrated sulphuric acid in the bath to react relatively violently with the silica fluorides which are produced by the reaction of the hydrofluoric acid with the silica content of the glassware. When working with the more common or high silica types of glass stock an increase of sulphuric acid such as contemplated by the present invention would be prohibitive because of the tendency of the sulphuric acid under such conditions to develop too violent an action against the fluorides with the result that an acid "burned" or scarred or greasy appearing surface will be invariably produced upon the stock piece. As distinguished from the above, in the case of the present invention the larger preponderance of sulphuric acid is beneficially employed to react so violently with the existing silica fluorides that the other salts are caused thereby to be loosened and detached from the glassware as an incident to the sulphuric acid reaction, but under such conditions the prime glass substance of the stock piece surface is unmarred and is otherwise unimpaired for optimum optical performance.

A preferred mode of practicing the present invention is to alternately immerse the barium glass stock piece in an acid bath as specified hereinabove for a few seconds while observing the production of salt formations at the surface of the stock piece. As the reaction of the acid bath on the glass stock progresses it will be noticed that a coating of flour-like salt by-product material will gradually form upon the stock piece surface; and if the acid bath mixture is of the proper proportion of sulphuric acid as specified hereinabove the blanket of salt by-products so formed will be soft and fluffy and adapted to be readily removed from time to time by simply wiping or rinsing the stock piece with water, or the like. If it is required to produce on the stock piece an accurately profiled finished surface of level and regular form it is preferable to initially grind the stock piece as by means of a conventional optical grinding process or the like so that the ground surface produced thereon accurately matches the profile prescribed for the finished article. The ground surface of the stock piece is then alternately immersed in the acid bath and rinsed as explained hereinabove until all of the fractured or otherwise imperfect surface structure of the stock piece has been removed, and whereby the resulting stock piece surface has been levelled off to the dimension and profile prescribed for the finished article.

During the early stages of the acid bath treatment the salt by-products referred to will be produced at relatively rapid rate due to the fact that at that stage of the operation the stock piece presents to the acid a surface comprising a mass of fractured and finely reduced glass particles resulting from the previous grinding operation. This mass of fine glass particles is readily permeable by the acid to the depth of the fractured zone, whereby the glass particles are subjected to attack from substantially all sides. Thus, during the early stages of the acid treating operation the time of each stock piece immersion will preferably be of short duration and only until a blanket of soft and fluffy salt by-products are generated to cover the stock piece surface. As the stock piece reducing process continues, however, the fractured zone of the stock piece surface is thereby gradually eliminated, whereby an increasingly solid front is presented by the stock piece to the acid bath.

During the latter stages of the operation, therefore, the acid bath reactions upon the glass substance proceed at a reduced rate; and each succeeding immersion of the stock piece in the acid bath may be conducted for a longer duration without permitting too heavy a coating of salt by-products to build upon the stock piece. Finally, as the stock piece surface reaches a level below the initial zone of fracturing, the surface of the stock piece assumes a perfectly regular and optically clear condition which resembles, to the naked eye, the general appearance of a conventionally ground and rouge polished optical glass surface except that the surface produced by the method of the present invention is not of the glossy and specular reflective type as is invariably produced by a rubbing operation such as in connection with a conventional optical grinding and rouge polishing method.

As in the case of most chemical reaction processes, the speed and other characteristics of the stock clearing and reducing actions of the acid bath of the invention will vary somewhat as the temperature of the bath changes, and thus the characteristics of the acid reaction may be controlled to some degree by regulating the temperature of the bath. This may be done, if desired, by subjecting the bath to heating or cooling influences externally thereof, in any manner such as is suitable and well known in the industrial arts. I have found, however, that the reaction processes normally develop heat to an extent such as to raise the temperature of a bath prepared in accord with the description hereinabove to somewhere within the range of 150-175° F., and that this temperature range is perfectly suitable for carrying on the method of the invention with good results. The speed of the action may be stimulated, however, by elevating this temperature as much as 50 or 100°, but the process then becomes so rapid that it becomes increasingly difficult to adequately observe and control the formation of acid reaction by-products on the stock piece as explained hereinabove, and to arrive finally at a perfectly regular and optically perfect finished surface. If the temperature of the bath is reduced to below the preferred range stated hereinabove, the bath becomes "sulky" with respect to its ability to handle the salt by-product formations, with the result that it is more difficult to clarify the stock piece surfaces to the desired finished form thereof.

I have also determined that it is preferable to arrange to reduce the violence of the sulphuric acid reaction upon the hydrofluoric acid by-products as referred to hereinabove toward the end of the stock piece finishing operation, in order to produce the best type of finished glass surface. That is because during the early stages of the acid bath treatments the freshly abraded stock piece presents to the acid bath a surface comprising a mass of fractured and pulverized glass which is readily permeable by the acid with the result that the acid attack takes place against the glass particles from substantially all sides thereof. Consequently, during the earlier stages of the acid bath process the by-product substances form at a greatly increased rate, and it is therefore required to provide a sulphuric acid of increased strength at this stage of the method. However, during the latter stages of the acid bath process the glass stock piece presents a more nearly solid front to the acid bath, with the result that by-products of the acid reaction are formed at greatly reduced rate. Under these conditions it is usually preferable to provide that the action of the sulphuric acid will be of reduced violence in order to obtain the best type of finished glass surface. This may be accomplished by simply adding water to the acid bath preliminary to the final processing steps; and the amount of water to be added will depend entirely upon conditions and will be regulated in accord with the observed performance of the acid bath as explained hereinabove.

It will be appreciated that although the method of the invention has been described and referred to hereinabove as being particularly adapted to the manufacture of lenses or other optical devices such as prisms, plates, or the like, the invention is not so limited but may be applied with equal facility to many other uses.

I claim:

1. The method of processing a barium containing glass stock piece to provide thereon a finished surface of optically regular and light transmissive form, comprising the steps of alternately immersing said stock piece in an acid bath until salt by-products of the acid reaction upon the glass appear to coat the stock piece and rinsing the coating by-products therefrom with water until an optically clear and regularly profiled surface of prime glass stock is exposed, said acid bath comprising a mixture of water and hydrofluoric and sulphuric acids wherein the proportion of sulphuric to hydrofluoric acid is of the order of 7 to 1 or greater depending upon the proportion of barium to silica content in the glass stock piece.

2. The method of processing a barium containing glass stock piece to provide thereon a finished surface of optically regular and light transmissive form, comprising the steps of mechanically abrading said stock piece to match the prescribed finished surface profile thereof, then alternately immersing said stock piece in an acid bath until salt by-products of the acid reaction upon the glass appear to coat the stock piece and rinsing the coating by-products therefrom with water until the abraded stock piece structure has been removed therefrom and an optically clear and regularly profiled surface of prime glass stock is exposed, said acid bath comprising a mixture of commercial hydrofluoric acid and commercial sulphuric acid wherein the proportion of sulphuric and hydrofluoric acid is within the range of 7:1 to 10:1.

VICTOR WALKER.